Dec. 5, 1967  M. J. HEIMOS ET AL  3,355,997

METHOD OF MAKING A VALVE BAG

Original Filed Sept. 22, 1964  2 Sheets-Sheet 1

Milton J. Heimos,
Avron A. Snabb,
Inventors.

Koenig, Senniger,
Powers and Leavitt,
Attorneys.

Dec. 5, 1967 M. J. HEIMOS ET AL 3,355,997
METHOD OF MAKING A VALVE BAG
Original Filed Sept. 22, 1964 2 Sheets-Sheet 2

United States Patent Office 3,355,997
Patented Dec. 5, 1967

3,355,997
METHOD OF MAKING A VALVE BAG
Milton J. Heimos, Minneapolis, and Avron A. Snabb, St. Paul, Minn., assignors to Bemis Company, Inc., Minneapolis, Minn., a corporation of Missouri
Original application Sept. 22, 1964, Ser. No. 398,316, now Patent No. 3,281,060, dated Oct. 25, 1966. Divided and this application Aug. 3, 1966, Ser. No. 569,912
9 Claims. (Cl. 93—35)

This application is a division of our copending application, Ser. No. 398,316, filed Sept. 22, 1964, now U.S. Patent No. 3,281,060 issued Oct. 25, 1966. This invention relates to a method of making bags, and more particularly valve bags made of heat-sealable sheet plastic material, such as polyethylene.

Among the several objects of the invention may be noted the provision of a method of making a valve bag, and particularly a heavy-duty valve bag, made of heat-sealable sheet plastic material (e.g., polyethylene) having a valve flap at one corner and a valve sleeve extending into the bag from the valve flap, in which the sleeve is also made of heat-sealable plastic sheet material (e.g., polyethylene) and heat-sealed to the valve flap; the provision of a method of making a valve bag such as described so constructed as inherently to tend to stretch the sleeve flat for tight sealing against leakage upon filling the bag; the provision of a method of making a valve bag such as described which has strong heat-sealed tape end closures; and provision of a method of making a valve bag such as described as to which seals are made in the region of the valve without blocking of the valve sleeve; and the provision of a method of making such bags wherein heat-sealing is effected without any necessity for interposition of separating elements between layers which are to be joined in part by a heat seal and in part free of one another. Other objects and features will be in part apparent and in part pointed out hereinafter.

The invention accordingly comprises the methods hereinafter described, the scope of the invention being indicated in the following claims.

In the accompanying drawings, in which one of various possible embodiments of the invention is illustrated, FIG. 1 is a view in elevation of one face of a flat plastic bag tube from which a bag is made in accordance with this invention;

FIG. 2 is a view in elevation of the other face of the tube;

FIGS. 3 and 4 are enlarged transverse sections taken on lines 3—3 and 4—4 of FIG. 1, respectively, thicknesses being exaggerated and these sections being partly broken away;

Figure 9:
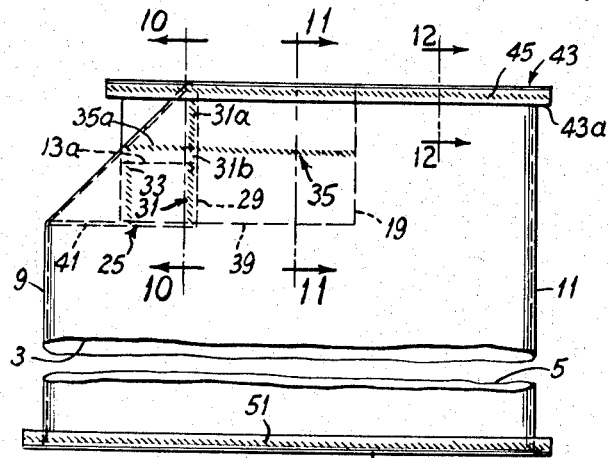
Figure 12:
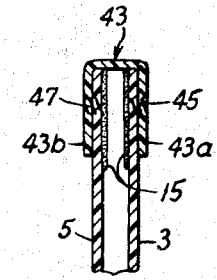
Figure 10:
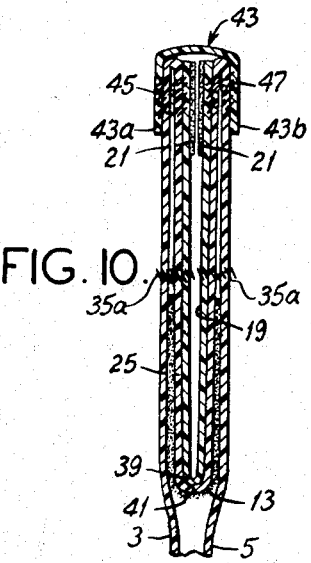
Figure 11:
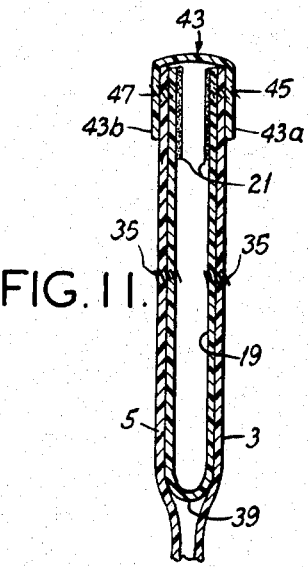

FIG. 9 is a view in elevation of a completed valve bag, broken away in part; and FIGS. 10, 11 and 12 are enlarged sections taken on lines 10—10, 11—11 and 12—12 of FIG. 9, respectively, with thicknesses exaggerated.

Corresponding reference characters indicate corresponding parts throughout the several views of the drawings.

Referring first to FIGS. 1–4 of the drawings, there is shown a flat bag tube 1 made from heat-sealable sheet plastic material, in particular polyethylene. This may be made, for example, by forming a continuous web of polyethylene into flat bag tubing with a back seam and segmenting the web into individual flat bag tubes 1 in conventional manner. One wall of the tube, which may be referred to as its front wall, is designated 3. Its other wall, which may be referred to as its back wall, is designated 5. The back seam of the tube, which is in its back wall 5, appears at 7 in FIGS. 2–4. The side edges of the flat tube are constituted by folds 9 and 11 in the sheet polyethylene. While a seamed tube is shown, it is contemplated that a seamless tube may be used.

Figure 1:
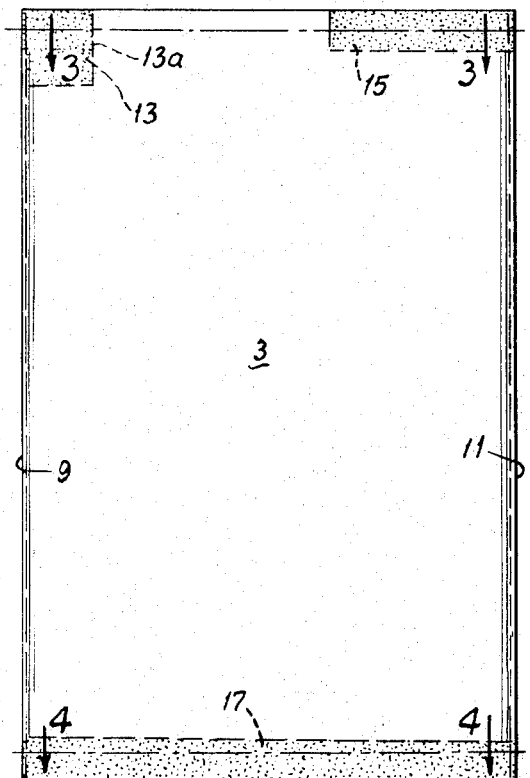
Figure 2:
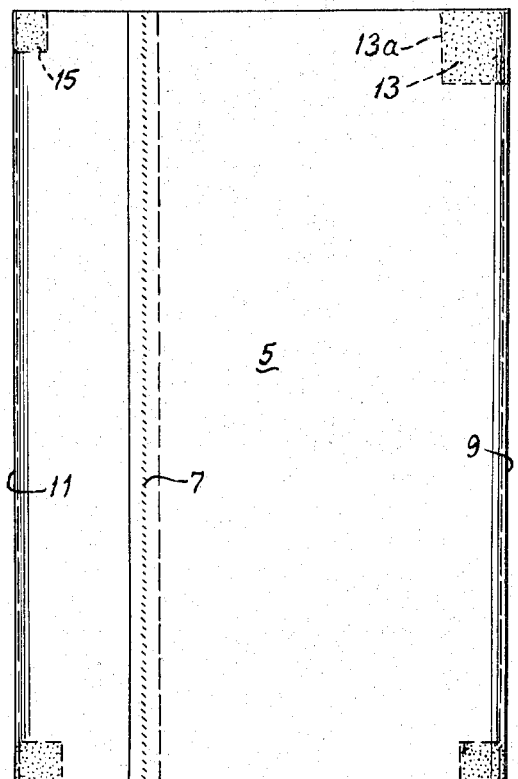
Figure 3:
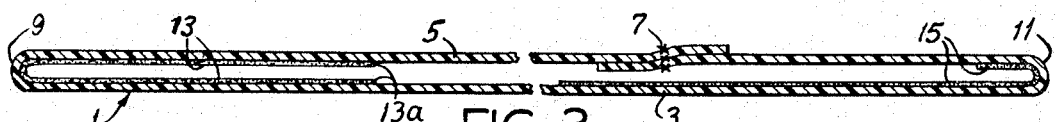
Figure 4:
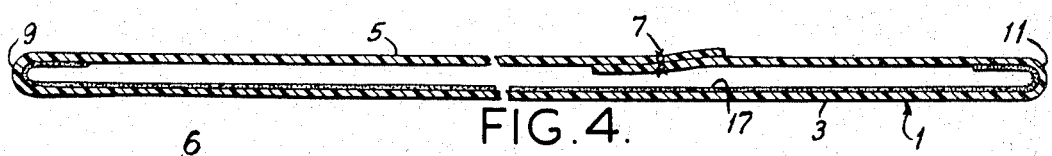

In accordance with this invention, the tube 1 is specially prepared with a first area 13 of heat-seal-inhibiting material in the form of a relatively wide band at one corner thereof which is to constitute the valve corner (the upper left corner as shown in FIG. 1) on the inside face of the tube. This band 13 extends along the inside of the upper margins of the front and back walls from the fold 9 part way across both walls of the tube, and around the fold. Further in accordance with this invention, the tube is specially prepared with a second area 15 of heat-seal-inhibiting material in the form of a band at the other corner of the valve end of the tube (the upper right corner as shown in FIG. 1) on the inside face of the tube. This band 15, which may be narrower than band 13, extends along the inside of the upper margin of one wall of the tube (the front wall 3 as shown) from the fold 11 part way across the tube, and may extend around the fold 11 and a short distance across the back wall 5. Additionally, the tube is prepared with a third area 17 of heat-seal-inhibiting material in the form of a band extending completely across the tube on the inside face thereof at the opposite end of the tube (i.e., its lower end as shown in FIGS. 1 and 2). This band 17 is shown as extending completely across the inside of one wall of the tube (the front wall 3), around folds 9 and 11, and part way across the inside of the other wall (the back wall 5), although it could extend substantially completely across the back wall 5.

Figure 5:
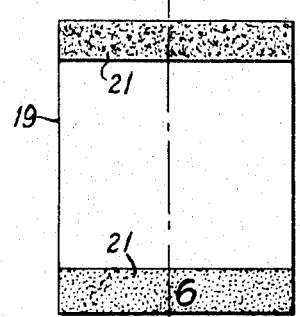
FIG. 5 is a view of one face of a valve sleeve which is assembled with the tube shown in FIGS. 1–4.
Figure 6:
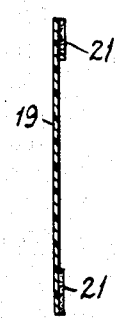
FIG. 6 is a section of the sleeve taken on line 6—6 of FIG. 5.

Referring next to FIGS. 5 and 6, there is shown a valve sleeve 19, which consists of a rectangular piece of heat-sealable sheet plastic material, in particular polyethylene, having stripes 21 of heat-seal-inhibiting material on one face thereof extending along the side margins of the sleeve from end-to-end thereof.

The heat-seal-inhibiting material used at 13, 15, 17 and 21 may be, for example, a commercially available polyamide-base ink which is unpigmented so as not to appear through the polyethylene. As noted above, tubes 1 may be made from a continuous web of polyethylene, and this web may be printed with said heat-seal-inhibiting ink in a suitable pattern to provide bands 13, 15 and 17 when the tubing into which the web is formed is segmented into individual bag tubes such as the tube 1. Sleeves 19 may be formed by applying continuous stripes of the heat-seal-inhibiting ink to a continuous strip of polyethylene, and segmenting the printed strip into individual sleeves.

Figure 7:
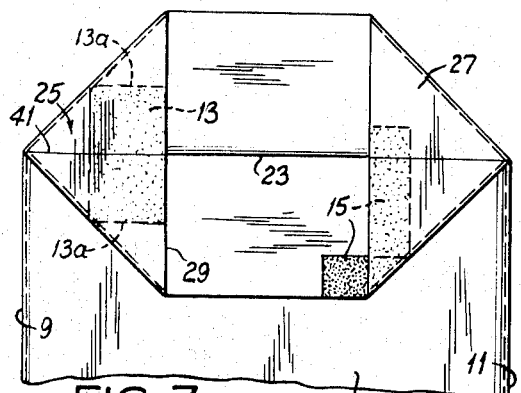
FIG. 7 is a view showing the upper end of the tube opened up for the formation of a valve flap and the application thereto of the valve sleeve.

As appears in FIG. 7, the valve end (the upper end) of the tube 1 is opened up folding open the upper portion of one wall of the tube (the front wall 3 as shown) on a fold line 23 extending transversely across the tube spaced from the upper end of the tube. This results in the formation of triangular flaps 25 and 27 at opposite corners of the valve end of the tube. The flap 25 at the left-hand corner as shown in FIG. 7, which constitutes the valve flap of the bag to be formed, has the band 13 of heat-seal-inhibiting material on the inside face thereof along its inner edge 29.

Figure 8:
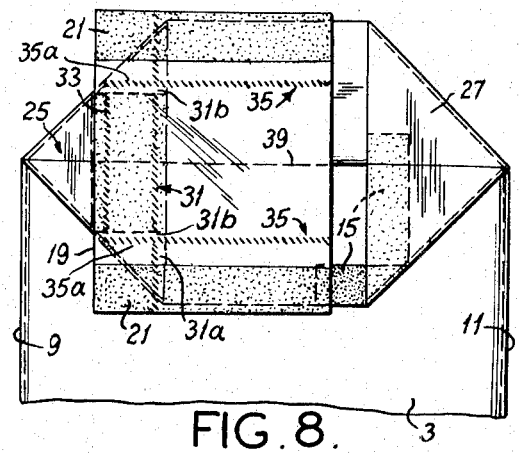
FIG. 8 is a view corresponding to FIG. 7 showing the sleeve applied to the valve flap.

As appears in FIG. 8, the sleeve 19 is applied to the opened-up end of the tube with the outer end portion of the sleeve overlying the inner margin of the valve flap 25, with the sleeve extending inward beyond the inner edge 29 of the valve flap, and with the stripes 21 of heat-seal-inhibiting material on the sleeve face up. With the sleeve lying flat on the opened-up end of the tube and positioned thereon as stated, the sleeve is heat-sealed to the valve flap 25 along two lines of seal 31 and 33 extending parallel to the inner edge 29 of the valve flap, the line of seal 31 lying closely adjacent the inner edge 29 of the valve flap and the line of seal 33 lying adjacent the outer end of the sleeve. It is also heat-sealed to the front and back walls (and further heat-sealed to the valve flap) along two lines of seal each designated 35 etxending lengthwise of the sleeve (i.e., transversely of the tube). This sealing is accomplished as by applying heated heat-sealing bars to the exposed face of the sleeve along lines 31, 33 and 35 and applying suitable pressure, with the opened-up end of the tube backed in any suitable way. The heat-seal-inhibiting material at 13 on the inside of the valve flap (which is interposed between the valve flap and the walls of the bag) prevents sealing of the valve flap to the walls of the tube, except along portions 35a of lines 35 which cross the valve flap and along portions 31a of line 31 which lie laterally outward of lines 35. In this regard, gaps 31b may be provided in line 31 to insure that there is no sealing of the valve flap to the walls of the bag in the regions between the ends 13a of band 13 and lines 35 (where there is no seal-inhibiting material).

Band 13 preferably has a total length (cross-wise of the triangular valve flap 25) approximating one-half the length of the inner edge 29 of the valve flap 29, and preferably slightly less than one-half the length of edge 29. That is, each half of the band 13 extending from fold 9 has a length approximating one-half the length of edge 29. Thus, considering the condition in which the valve flap 29 is opened up as shown in FIG. 7 and sleeve 19 is applied thereover as shown in FIG. 8, the ends 13a of band 13 are located approximately half way between the longitudinal center line 39 of the sleeve and the side edges of the sleeve, preferably being spaced inward from the side edges of the sleeve a distance slightly greater than one-quarter the width of the sleeve and hence slightly greater than one-quarter the length of the inner edge 29 of the valve flap 25. Portions 35a of lines 35 are located slightly outward of ends 13a of band 13, preferably being spaced inward of the side edges of the sleeve a distance slightly less than one-quarter the width of the sleeve.

After the sealing of the sleeve 19 to the valve flap 25 and to the walls 3 and 5 of the tube as above described, the opened-up portion of the front wall 3 is folded back on the upper portion of the back wall 5. In the course of this folding back of the opened-up portion of the front wall, the valve sleeve 19 is folded in half on its longitudinal center line 39 in FIGS. 5 and 8–11 and the valve flap 25 is folded in half on its longitudinal center line indicated at 41 in FIGS. 7–10. However, flap 27 is opened up flat so that the upper right-hand corner of the tube reverts to its original condition. The width of the sleeve is such that its sides reach generally to the upper end edge of the tube.

Then, the upper end of the tube is provided with a closure by folding a length of heat-sealable tape 43, in particular a polyethylene tape, around the end of the tube, and applying heat and pressure to the associated tube and tape to effect heat-sealing of one side 43a of the folded tape to the outside of wall 3 all along a seal 45 extending throughout the width of the upper end of the tube, and heat-sealing of the other side 43b of the folded tape all along a seal 47 extending throughout the width of the upper end of the tube. While the walls of the tube become heat-sealed to the respective halves of the sleeve 19 along the lines 43a and 43b, the stripes 21 of heat-seal-inhibiting material at the side margins of the sleeve prevent heat-sealing together of the halves of the sleeve along these lines. The heat-seal-inhibiting material at 15 prevents heat-sealing together of the walls 3 and 5 along the line of the seals at 45 and 47 all the way from the inner end of the sleeve to the right-hand side edge 11 of the tube. Thus the walls of the tube and the two halves of the sleeve are free of one another throughout the width of the upper end of the tube.

The lower end of the tube is closed by folding a length of heat-sealable plastic tape 49, in particular a polyethylene tape, around the lower end of the tube and applying heat and pressure along a line 51 within the confines of band 17 of heat-seal-inhibiting material to effect heat-sealing of one side of the tape 49 to wall 3 and the other side of the tape 49 to wall 5 without any heat-sealing together of walls 3 and 5 along line 51 (this being inhibited by the band of heat-seal-inhibiting material 17).

The sealing of the tapes 43 and 49 to the ends of the bag may be carried out by means of a conventional band sealer. It may be desirable to use thicker tape at 43 than at 49 since the thickness at various regions along seal 47 is greater than along seal 51, and thicker tape may be needed at 43 to resist higher sealing pressures encountered at these thick regions in passing between the sealing bands. For example, the tape used at 43 may be eight mils thick, compared with five mil tape at 49. Or two layers of five mil tape may be used at 43, and one at 49.

As will be seen, the completed bag comprises the flat tube 1 of heat-sealable sheet plastic material (e.g., polyethylene) having valve flap 25 extending inward at the valve corner at one end (its upper left-hand corner as illustrated in FIG. 9). The valve flap 25 is folded in half on its longitudinal center line 41 and has heat-seal-inhibiting material (e.g., polyamide-base ink) coated on its inside face at 13. The valve sleeve 19, made of heat-sealable sheet plastic material (e.g., polyethylene), and folded in half on its longitudinal center line 39, has its outer end overlying the valve flap and extends therefrom into the bag. The sides of the sleeve reach generally to the said one end (the upper end) of the tube. The sleeve, at its outer end, is heat-sealed to the valve flap, as at 31 and 33. It has heat-seal-inhibiting material at 21 along at least one side margin. In this regard, one stripe 21 may be sufficient (as distinguished from the provision of stripes 21 on both side margins of the sleeve). Wall 3 of the tube has heat-seal-inhibiting material at 15 on the inside face thereof along the said one end (the upper end) of the tube from the inner end of the sleeve to the other corner of the tube at said one end of the tube, i.e., the upper right-hand corner of the tube as viewed in FIGS. 1 and 9. Tape 43 constitutes a closure for the valve end of the tube, being folded around this end of the tube, with one side 43a of the folded tape heat-sealed to the outside of wall 3 along line 45 and the other side 43b of the tape heat-sealed to the outside of wall 5 along line 47 within the confines of the heat-seal-inhibiting material at 21 between the margins of the sleeve and the heat-seal-inhibiting material at 15. Tape 49 constitutes a similar closure for the lower end of the tube.

The closure consituted by tape 43 heat-sealed by the seals at 45 and 47 to the outside faces of the bag walls 3 and 5 but without any sealing together of the inside faces of the bag walls or the two halves of the sleeve in view of the positive inhibition of sealing by the heat-seal-inhibiting material at 15 and 21, is a strong closure, stresses incurred on dropping or other rough handling of the filled bag being taken in shear by the seals 45 and 47. As will be understood, these seals are strongly resistant to separation in shear. Similar considerations apply to the closure consituted by tape 49. Positive elimination of a face-to-face seal between walls 3 and 5 by means of the heat-seal-inhibiting material at 15, 17 and 21 insures preservation of the strength of the seals at 45, 47 and 51. If there were a face-to-face seal between the walls 3 and 5 along the line of seals 45 and 47 or along the line of seal 51, it would be a weak seal, resisting rupture only by its resistance to peeling apart, and its peel resistance would inherently be low. In this regard, it will be understood that the resistance to rupture of a heat seal in peel is considerably less than its resistance to rupture in shear. The face-to-face seal would tend to peel apart under stresses incurred on rough handling of the bag, and this would tend to weaken the bag along the line of seals 45 and 47 and the line of seal at 51. Consequently, the strength of the bag is preserved by positive inhibition of a face-to-face seal between the bag walls along the lines of the end seals. Moreover, without a face-to-face seal between the bag walls along these lines, the capacity of the bag is increased or, conversely, the bag may be shorter for a given capacity. This is because the tapes 43 and 49 initially form the end closures at the very ends of the bag tube, rather than face-to-face seals between the bag walls spaced from the ends of the bag tube.

When the opened-up portion of the front wall 3 is folded back on the upper portion of the back wall 5, with resultant folding in half of the valve sleeve 19 on its longitudinal center line 39, as above described, seals 35 become located approximately half way between the resultant folds at 39 and 41 in the sleeve and valve flap and the end of the bag (preferably slightly nearer the end of the bag than the folds at 39 and 41). Thus, these lines 35 lie generally coincident with the lines on which the walls of the bag fold when the bag is filled and the end of the bag squares out. As a result of the two halves of the sleeve being sealed to the walls of the bag along lines 35 at the stated locations, when the top of the bag is squared out (as inherently occurs on filling the bag) the valve sleeve is nicely pulled out flat by forces transmitted from the bag walls to the sleeve via the seals on lines 35, with attendant tight sealing of the valve sleeve to preclude leakage of the bag contents. The lines of seal 35 extend substantially throughout the length of the sleeve and, in the outer end portion of the sleeve which laps the valve flap, portions 35a thereof seal together the sides of the sleeve, the valve flap and the walls of the bag. Portions 31a of lines of seal 31, lying outside the confines of area 13 of heat-seal-inhibiting material, secure together the sides of the sleeve and the walls of the bag, but only outward of lines 35.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

What is claimed is:

1. The method of making a valve bag of heat-sealable sheet plastic material comprising forming a flat tube of said plastic material with heat-seal-inhibiting material in an area on the inside thereof extending around one corner at one end of the tube, opening up said one end of the tube by folding open a portion of one wall of the tube on a fold line extending transversely across the tube to form a valve flap at said one corner, with said heat-seal-inhibiting material on the inside of said flap, positioning a valve sleeve of heat-sealable sheet plastic material on the opened-up end of the tube with one end of the sleeve constituting its outer end overlying the flap and with the sleeve extending inward from the flap, heat-sealing the sleeve to the flap by applying heat and pressure in the region of said heat-seal-inhibiting material, folding closed the opened-up end portion of the said one wall of the tube with accompanying folding in half of the sleeve and flap on their longitudinal center lines, and forming closures for the ends of the tube.

2. The method of claim 1 wherein, with the sleeve applied to the open-up end of the tube, the sleeve is heat-sealed to the walls of the tube along lines extending lengthwise of the sleeve between its longitudinal center line and its side edges.

3. The method of making a valve bag of heat-sealable sheet plastic material comprising forming a flat tube of said plastic material with heat-seal-inhibiting material in a first area on the inside thereof extending around one corner at one end of the tube, and with heat-seal-inhibiting material in a second area on the inside thereof extending inward from the other corner at said one end of the tube, opening up said one end of the tube by folding open a portion of one wall of the tube on a fold line extending transversely across the tube to form a valve flap at said one corner, with said first area of heat-seal-inhibiting material on the inside face of said flap, positioning a valve sleeve of heat-sealable sheet plastic material on the opened-up end of the tube with one end of the sleeve constituting its outer end overlying the valve flap and with the sleeve extending inward from the valve flap, said sleeve having a stripe of heat-seal-inhibiting material on its outside face along at least one side margin thereof, heat-sealing the sleeve to the valve flap by applying heat and pressure to the sleeve in the region of said first area and heat-sealing the sleeve to the walls of the tube along lines of seal extending lengthwise of the sleeve between the longitudinal center line of the sleeve and the side edges of the sleeve, folding closed the opened-up end portion of the said one wall of the tube with accompanying folding in half of the sleeve and valve flap on their longitudinal center line, folding a tape of heat-sealable sheet plastic material around said one end of the tube, applying heat and pressure to the opposite sides of the tape to heat-seal them to the outsides of the tube walls along a line extending transversely across the tube adjacent said one end of the tube and within the confines of said second area of heat-seal-inhibiting material and said stripe of heat-seal-inhibiting material on the sleeve, and forming a closure for the other end of the tube.

4. The method of claim 3 wherein said lines of seal which extend lengthwise of the sleeve are located generally half way between the longitudinal center line of the sleeve and the side edges of the sleeve.

5. The method of claim 4 wherein the sleeve at its outer end is heat-sealed to the valve flap on lines of seal extending parallel to the inner edge of the valve flap in the region of said first area.

6. The method of making a valve bag of heat-sealable sheet plastic material comprising forming a flat tube of said plastic material with heat-seal-inhibiting material in a first area on the inside thereof extending around one corner at one end of the tube, with heat-seal-inhibiting material in a second area on the inside thereof extending inward from the other corner at said one end of the tube, and with heat-seal-inhibiting material in a third area on the inside thereof at the other end of the tube extending completely across the tube, opening up said one end of the tube by folding open a portion of one wall of the tube on a fold line extending transversely across the tube to form a valve flap at said one corner, with said first area of heat-seal-inhibiting material on the inside face of said flap, positioning a valve sleeve of heat-sealable sheet plastic material on the opened-up end of the tube with one end of the sleeve constituting its outer end overlying the valve flap and with the sleeve extending inward from the valve flap, said sleeve having a stripe of heat-seal-inhibiting material on its outside face along at least one side margin thereof, heat-sealing the sleeve to the valve flap by applying heat and pressure to the sleeve in the region of said first area and heat-sealing the sleeve to the walls of the tube along lines of seal extending lengthwise of the sleeve between the longitudinal center line of the sleeve and the side edges of the sleeve, folding closed the opened-up end portion of the said one wall of the tube with accompanying folding in half of the sleeve and valve flap on their longitudinal center line, folding a tape of heat-sealable sheet plastic material around said one end of the tube, applying heat and pressure to the opposite sides of the tape to heat-seal them to the outsides of the tube walls along a line extending transversely across the tube adjacent said one end of the tube and within the confines of said second area of heat-seal-inhibiting material and said stripe of heat-seal-inhibiting material on the sleeve, folding a tape of heat-sealable sheet plastic material around the other end of the tube, and applying heat and pressure to opposite sides of the latter tape to seal them to the outsides of the tube walls along a line extending transversely across the tube adjacent said other end of the tube and within the confines of said third area of heat-seal-inhibiting material.

7. The method of claim 6 wherein said lines of seal which extend lengthwise of the sleeve are located generally half way between the longitudinal center line of the sleeve and the side edges of the sleeve.

8. The method of claim 6 wherein the sleeve at its outer end is heat-sealed to the valve flap on lines of seal extending parallel to the inner edge of the valve flap in the region of said first area.

9. The method of claim 8 wherein said areas of heat-seal-inhibiting material are ink-imprinted areas.

References Cited
UNITED STATES PATENTS

| | | | |
|---|---|---|---|
| 2,959,343 | 11/1960 | Rosander | 229—62.5 |
| 3,237,534 | 3/1966 | Lissner | 93—8 XR |

BERNARD STICKNEY, *Primary Examiner.*